US008641545B2

(12) United States Patent
Meigs et al.

(10) Patent No.: US 8,641,545 B2
(45) Date of Patent: Feb. 4, 2014

(54) DISTRIBUTED SCORING SYSTEM

(75) Inventors: Brandon J. Meigs, Spring Lake, MI (US); Gary A. Brouwers, Allendale, MI (US)

(73) Assignee: Brunswick Bowling & Billiards Corporation, Lake Forest, IL (US)

( * ) Notice: Subject to any disclaimer, the term of this patent is extended or adjusted under 35 U.S.C. 154(b) by 93 days.

(21) Appl. No.: 13/413,133

(22) Filed: Mar. 6, 2012

(65) Prior Publication Data

US 2013/0237334 A1     Sep. 12, 2013

(51) Int. Cl.
    *A63F 13/00*     (2006.01)
(52) U.S. Cl.
    USPC ............................................. 473/54; 463/42
(58) Field of Classification Search
    USPC ........................................ 473/54, 64; 463/42
    See application file for complete search history.

(56) References Cited

U.S. PATENT DOCUMENTS

| | | | |
|---|---|---|---|
| 6,623,369 B1 | 9/2003 | Shea | |
| 6,764,410 B2 | 7/2004 | Apple et al. | |
| 7,025,687 B2 * | 4/2006 | Bouchard | 473/54 |
| 7,037,198 B2 | 5/2006 | Hameen-Anttila | |
| 7,435,184 B1 | 10/2008 | Tsujita | |
| 8,066,572 B1 | 11/2011 | Timmons et al. | |
| 8,302,015 B2 * | 10/2012 | Krishnan et al. | 715/747 |
| 2002/0010032 A1 | 1/2002 | Stiteler | |
| 2002/0016209 A1 | 2/2002 | Bates | |
| 2002/0147514 A1 | 10/2002 | Apple et al. | |
| 2003/0033324 A1 | 2/2003 | Golding | |
| 2005/0101397 A1 | 5/2005 | Bouchard | |
| 2005/0164797 A1 | 7/2005 | Jacover | |
| 2005/0288115 A1 | 12/2005 | Popielarz et al. | |
| 2006/0259564 A1 | 11/2006 | Stark et al. | |
| 2009/0070222 A1 | 3/2009 | Kestenbaum | |
| 2009/0143883 A1 * | 6/2009 | Pines et al. | 700/92 |
| 2009/0177776 A1 | 7/2009 | Denker et al. | |
| 2010/0046443 A1 | 2/2010 | Jia et al. | |
| 2010/0134687 A1 | 6/2010 | Vaioli | |
| 2011/0034261 A1 | 2/2011 | Kawaguchi | |
| 2012/0010930 A1 | 1/2012 | Langdon | |

OTHER PUBLICATIONS

Office Action for U.S. Appl. No. 13/413,035 dated May 29, 2013, 13 pages.
"ClayTracker-Skeet & Sporting Clays Scorekeeper for iPhone," Expogo, Inc., http://download.cnet.com/ClayTracker-Skeet-Sporting-Clays-Scorekeeper, accessed Oct. 11, 2011.

(Continued)

Primary Examiner — James S McClellan
(74) Attorney, Agent, or Firm — Brinks Gilson & Lione

(57) ABSTRACT

In one embodiment, a distributed bowling center system includes two or more computing devices associated with respective bowling center peripherals. The bowling center peripherals are any electronic or mechanical device in a bowling center capable of detecting a bowling event or receiving input. Example bowling center peripherals include a pinsetter, a monitor, a bumper, a keypad, or a touchscreen. The bowling center peripherals are configured to perform at least one bowler center function. The computing devices are configured to execute at least one process related to a bowler center function of the associated peripheral. Each computing device is located physically closer to the peripheral than the other computer device. The computing devices are in communication via a network. The computing devices are configured to access a process map defining the communication, which is responsive to the at least one bowler center function.

23 Claims, 5 Drawing Sheets

(56) References Cited

OTHER PUBLICATIONS

"Bowling Buddy Stats Tracker," Whole Brain Studios, http://itunes.apple.com/app/bowling-buddy-stats-tracker/id348535923?mt=8, accessed Oct. 21, 2011.

"Bowling Scoreboard", raketenpioniere, http://itunes.apple.com/app/bowling-scoreboard/id313837528?mt=8, accessed Oct. 21, 2011.

"Bowling Score," castillasoft, http://itunes.apple.com/app/bowling-score/id408226455?mt=8, accessed Oct. 21, 2011.

"Duo Installation Instructions & Reference Guide," Computer Score Computer Scoring Systems, Jan. 12, 2012.

"Center Command, Version 3, Operations Manual," Computer Score Computer Scoring Systems, Dec. 7, 2011.

"Qubica Worldwide, VDB Automatic Scoring System, Installation Manual," Oct. 2005.

"Brunswick, Vector-Plus Center Network System," accessed Nov. 15, 2011.

"Brunswick, Bowling Center Products," accessed Nov. 15, 2011.

International Search Report and Written Opinion for PCT/US2013/026636, dated Mar. 14, 2013, 10 pages.

International Search Report and Written Opinion for PCT/US2013/026637, dated Apr. 26, 2013, 15 pages.

Office Action for U.S. Appl. No. 13/413,035, dated Feb. 15, 2013, 15 pages.

Office Action for U.S. Appl. No. 13/413,035 dated Sep. 19, 2013, 13 pages.

* cited by examiner

DISTRIBUTED SCORING SYSTEM

BACKGROUND

Monolithic scoring systems are available for bowling systems that connect a central lane computer to a pinsetter, an overhead display, a touchscreen display, and a keyboard. The scoring systems utilize several types of signals that are transmitted by different types of communication lines. Because of the required length of a bowling lane, a significant number of the communication lines are lengthy, spanning up and down the bowling lane.

Lengthy communication lines introduce disadvantages in several areas of communication in a bowling center. Communication between the overhead display and the central lane computer introduces electrical noise and video noise, which can render the communication lines incompatible with high definition video. Communication between the pinsetter and the central lane computer also introduces mechanical noise from the pinsetters into the scoring system. Further, timing critical in the pinsetter operation may be disrupted by other devices connected to the scoring system. Finally, the communication lines between the central lane computer and the touchscreen display and/or the overhead display and the central lane computer require expensive video cables.

OVERVIEW

Embodiments of the present invention are defined by the claims, and nothing in this section should be taken as a limitation on those claims.

By way of introduction, the below embodiments relate to a method and system for distributed devices in a scoring system of a bowling center. In one embodiment, a distributed bowling center system includes two or more computing devices associated with respective bowling center peripherals. The bowling center peripherals are any electronic or mechanical device in a bowling center capable of detecting a bowling event or receiving input. Example bowling center peripherals include a pinsetter, a monitor, a bumper, a keypad, or a touchscreen. The bowling center peripherals are configured to perform at least one bowler center function. The computing devices are configured to execute at least one process related to a bowler center function of the associated peripheral. Each computing device may be located physically closer to the peripheral than the other computer device. The computing devices are in communication via a network. The computing devices are configured to access a process map defining the communication, which is responsive to the at least one bowler center function.

Other embodiments are possible, and each of the embodiments can be used alone or together in combination. Accordingly, various embodiments will now be described with reference to the attached drawings.

DETAILED DESCRIPTION OF THE PRESENTLY Preferred Embodiments

Introduction

In general, the following embodiments describe a distributed scoring system for a bowling center. In one embodiment, the distributed scoring system or distributed high-definition scoring system is compatible with high-definition video because the communication lines for video are within an acceptable length for high-definition video. The distributed scoring system includes multiple computing devices, which are physically distributed apart from one another. The multiple computing devices execute processes through a communication protocol that simplifies and abstracts the operation and configuration of the computing devices. Some of the processes may be executed interchangeably at different computing devices.

The distributed scoring system includes multiple peripherals, such as pinsetters, monitors, bumpers, keypads, touchscreens, and a serial local area network (LAN), each of which is configured to perform a bowling center function. Because the computing devices are distributed, the computing devices may be placed closer to their respective scoring system peripherals, which allows for shorter communication lines. Shorter connection lines are less expensive, reduce electrical and mechanical noise, and are capable of higher bandwidth.

In one embodiment, the distributed scoring system defines the communication protocol through a process map, which defines communication between computing devices and/or relates processes, peripherals, and computing devices. The communication protocol allows for configuration of the distributed scoring system in real-time, simplifying the addition or removal of hardware devices or peripherals. Further, the distribution of hardware devices also allows for fewer failure nodes, enabling real-time recovery from failures.

Before turning to these and other embodiments, the following section describes exemplary host and storage devices. It should be noted that these exemplary host and storage devices are merely examples and that other architectures can be used.

Exemplary Distributed Scoring System

Figure 1:
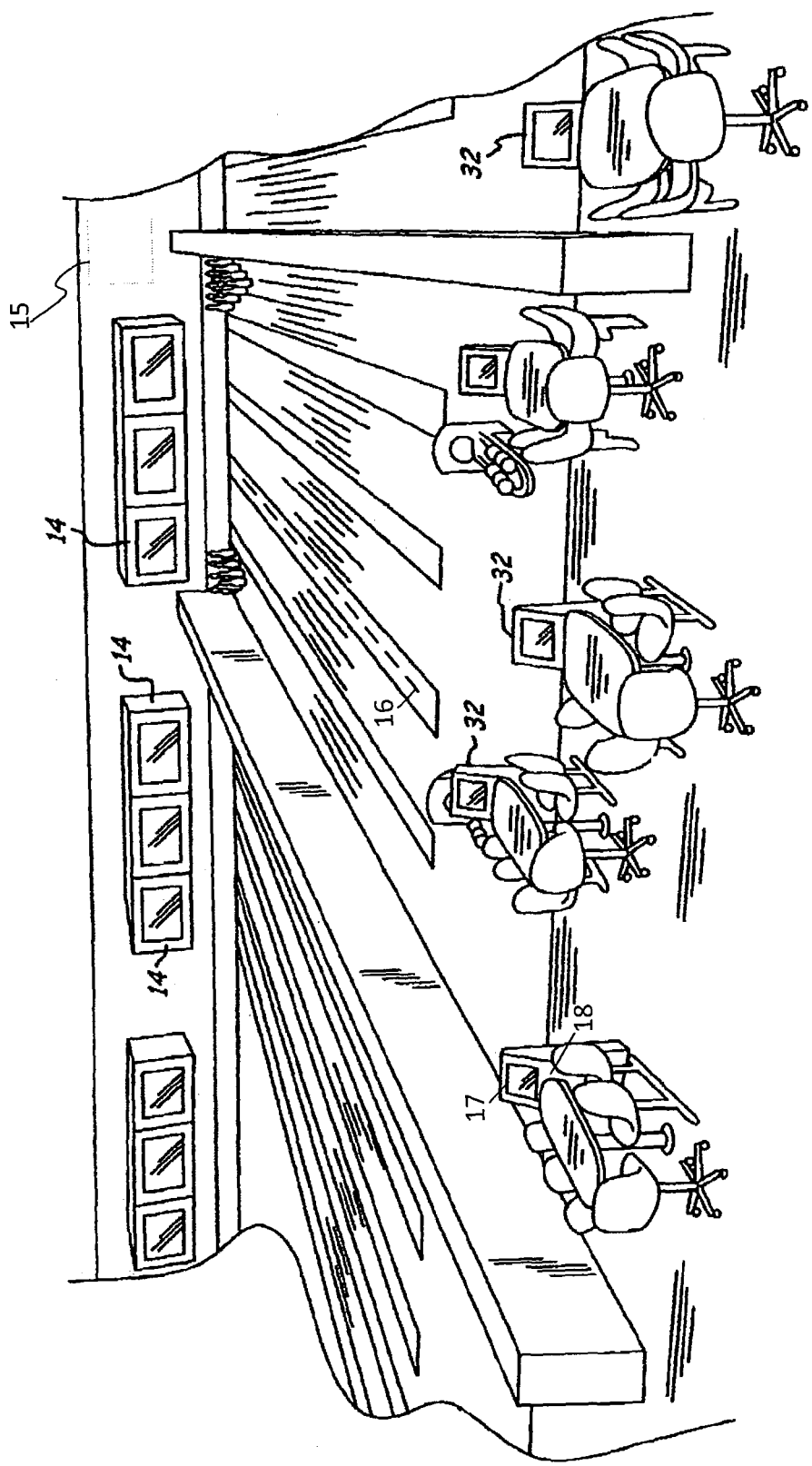
FIG. 1 illustrates a bowling center.

Turning now to the drawings, FIG. 1 illustrates a bowling center for use with the distributed scoring system. The bowling center includes peripherals, which are pieces of hardware or other machines that perform a specific bowling center function. Example types of peripherals include an overhead display 14, a pinsetter 15, a bumper 16, a touchscreen 17 of the console 32, a keypad 18 of the console 32, or a serial LAN. Each console 32 may include a touchscreen, a keypad, or both. The consoles 32 may be omitted.

The overhead display 14 may be a liquid crystal display (LCD) panel, light emitting diode (LED) screen, cathode ray tube (CRT), or another type of display. The overhead display 14 may be a television including a tuner and speakers.

The pinsetter 15 may be any type of pinsetter. Example types of pinsetter include the A2 pinsetter, the GS pinsetter, or a string pinsetter. The A2 pinsetter includes a sheet metal enclosure and pin chutes that are used to transfer the pins from to the deck for transfer to the lane. The GS pinsetter includes a plurality of belts to transfer the pins to a vertical elevator for placement to the lane. The string pinsetter resets pins by pulling the pins up by a cord attached to each pin.

The bumper 16 may be part of an automatic bumper system. For example, the bumper 16 may be a plastic or metal rail that extends the length of the bowling lane. In a retracted state, the bumper 16, is out of sight below the bowling lane, below the gutter, or between gutters. In an active state, the bumper 16 extends above the gutter to block bowling balls from entering the gutter.

The touchscreen 17 may be a LCD panel, LED screen, CRT, or another type of display. The touchscreen 17 may be resistive or capacitive. The touchscreen 17 may be sole input device or the touchscreen may be combined with the keypad 18. In addition, the input device may include one or more buttons, a mouse, a stylist pen, a trackball, a rocker switch, a touch pad, a voice recognition circuit, or other device or component for inputting data. The keypad 18 also may be standalone without a touchscreen or any type of display. The serial LAN may be a communication line configured to operate under the RS-232 standard using serial binary single-ended data and control signals or under universal serial bus (USB) standard.

The bowling center includes multiple bowling lanes. The bowling lanes may be grouped individually, in pairs, in groups of four, or another number for each distributed scoring system.

Figure 2:
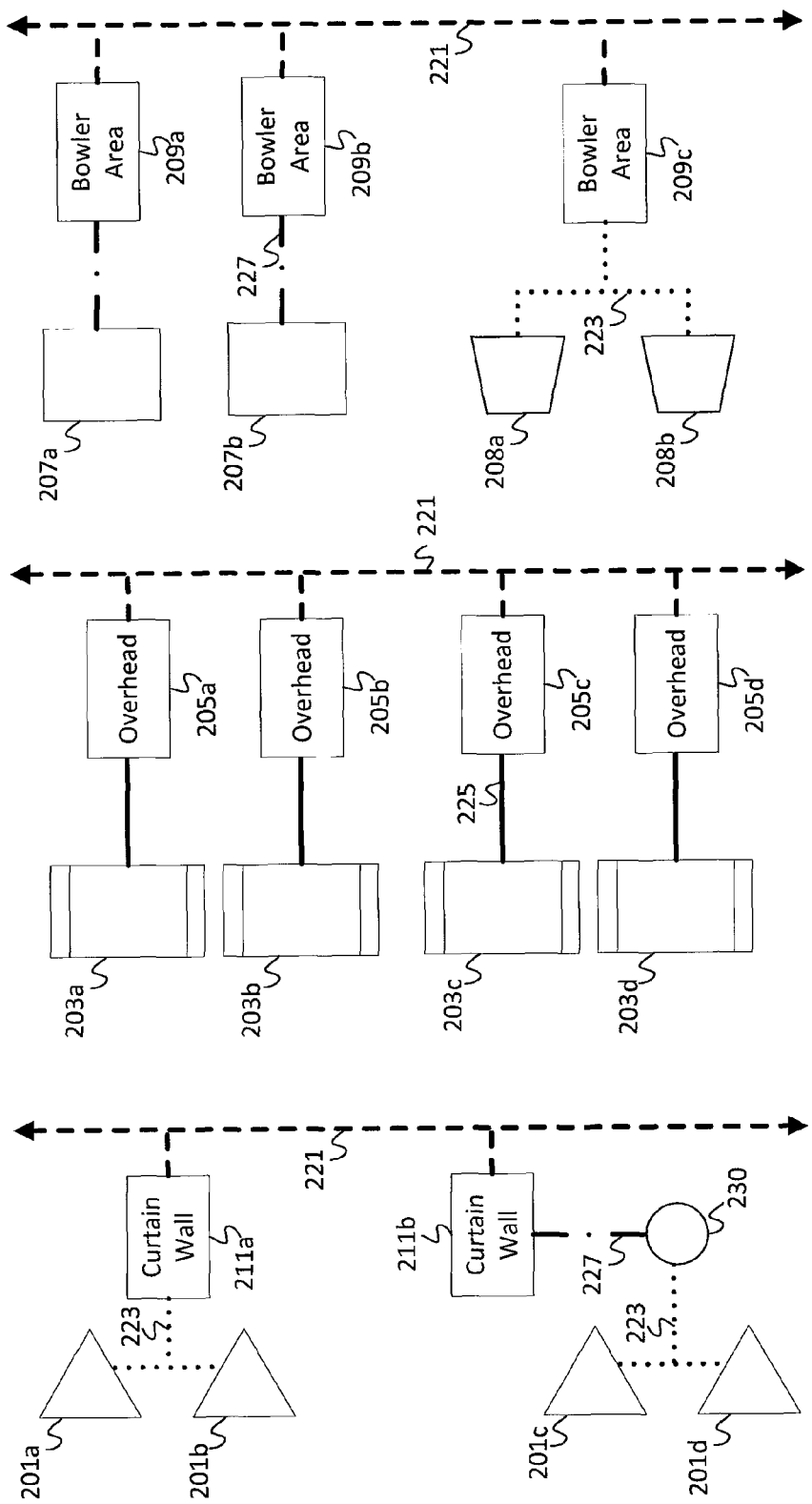
FIG. 2 illustrates a block diagram of one embodiment of a distributed scoring system.

FIG. 2 illustrates a block diagram of a distributed scoring system. The distributed scoring system includes peripherals, computing devices, and communication lines. A computing device is an intelligent piece of hardware that performs tasks. The computing device may be general purpose computer, or the computing device may be specialized for a peripheral or set of peripherals hosted by the computing device. The distributed scoring system is a peer-to-peer system, which means that the computing devices share in the execution of the processes of the scoring system. The distributed scoring system may lack a central node or computing device. However, the computing devices may be unequal in terms of resources and one computing device may be preferred to another for specific processes.

The computing device executes bowling center processes assigned to the computing device. A bowling center process is software or logic configured to perform a bowling center function. A bowling center function may be specific to a peripheral or a set of peripherals. Alternatively, a bowling center function may be performed internally to a computing device and without relationship to a peripheral.

As shown in FIG. 2, example computing devices include curtain wall computing devices 211a-b, overhead computing devices 205a-d, and bowler area computing devices 209a-c. Other types of computing device may include a back office computing device, a desk area computing device, and/or a test area computing device.

A curtain wall computing device 211 is connected to one or more pinsetters 201. For example, each curtain wall computing device 211 may host a pair of pinsetters 201. In addition or in the alternative, the curtain wall computing device 211 may be connected to a camera 230. The camera 230 is a peripheral that detects which pins remain after a ball is thrown. The camera 230 may be a charge coupled device (CCD) scanner. The camera 230 may take a picture of the pin deck or pit area, which is analyzed either internally at the camera 230 or by the curtain was computing device 211. The analysis may detect pins by brightness of particular areas in the picture. The pinsetters 211 may be directly connected to the curtain wall computing device 211b or indirectly connected through the camera 230.

In one alternative, the curtain wall computing devices 211 are omitted. In this example, the pinsetters 211 and the camera 230 interface directly with the network 221. Processes related to the curtain wall computing devices 211 are distributed to other computing devices such as the overhead computing device 205.

An overhead computing device 205 is connected to one or more overhead monitors 203. The overhead computing device 205 is configured to run processes related to the display on the overhead monitors 203. The overhead computing device 205 may be configured to process and transmit high definition video to the overhead monitors 203. The overhead computing device 205 may be configured to select television, DVD, or VCR inputs for the overhead monitors 203.

A bowler area computing device 209 is connected to a touchscreen display 207, a keypad 208, or both. The bowler area computing device 209 is configured to run processes related to the calculation of bowling scores, input processes associated with the input device, and output processes.

Other types of computing device may include a back office computing device, a desk area computing device, and/or a test area computing device. The back office computing device may be configured to run processes related to the management of the bowling center such as employee scheduling or customer reservations. The desk area computing device may run processes related to the point of sale system of the bowling center. The test area computing device may be a configurable device configured to test the scoring network device and other computing devices.

While not to scale, FIG. 2 illustrates that each of the computing devices is physically located close to the peripherals that the respective computing devices hosts. Each computing device is closer to one of the peripherals that another of the peripherals. For example, the overhead computing device 205 is closer to the overhead monitor 203 than the overhead computing device 205 is to other peripherals, such as the pinsetters 201 or the keypads 208. Similarly, the curtain wall computing device 211 is closer to the pinsetter 201 than the curtain wall computing device 211 is to the overhead monitor 203 or the touchscreens 207.

The communication lines of the distributed scoring system may include up to four or more different types of communication lines, which may be cables. The backbone of the scoring network may be at Ethernet network 221, which is shown in bold dashed lines in FIG. 2. Communication between the overhead monitors 203 and the overhead computing devices 205 involves a video cable 225, which may be a high definition video cable. Serial cables 223 may provide communication line between the pinsetters 201 and the curtain wall computing device 211 and between the keypads 207 and the bowler area computing device 209. Serial cables 223 may also be used between bumpers 16 and the overhead computing device 205 or the bowler area computing device 209. Combination serial-video cables 227 may be used between the bowler area computing device 209 and the touchscreen 207 and/or between the camera 230 and the curtain wall computing device 211. The terms network or scoring network may refer to the Ethernet network 221 or collectively the Ethernet network 221, the serial cables 223, the video cables 225, and the serial-video cables 227.

A process map defines communication between the computing devices on the scoring network. More specifically, the process map is a data construct that describes relationships between the peripherals, devices, and processes within the distributed scoring system. The process map associates a network address on the scoring network to an identity of each computing device. The process map may be implemented as a lookup table stored in a memory, which can be queried with an identity of a computing device and returns a network address and/or a port number. The identity of a computing device may comprise a device type and a device number. The device type may be based on location or function. The memory storing the process map may be stored locally in each computing device or in a central location. The central location may be any one of the computing or hosted in a database or externally at a location on the Internet.

Through the process map, any bowling center process running on any of the computing device can call computing devices by type and number with no knowledge of the bowling center's configuration or the location of the computing devices on the scoring network. The actual address of the computing device may be resolved at the time that the bowling center process runs, which may be referred to as real time. The bowling center process may be triggered by the bowling center function at the peripheral. Accordingly, the computing device accesses the process map in order to facilitate communication between the computing devices and responsive to the bowling center function.

The configuration of the distributed scoring network can be changed, reconfigured, or installed without requiring any changes to the computing devices or the bowling center processes that run on the computing devices. The process map may be manipulated to account for changes, reconfigurations, or installations of the distributed scoring network.

The computing devices generate scoring system packages using the process map. A scoring system package includes network address for the computing device that generated the scoring system package, a network address for the computing device that the scoring system package is addressed to, and at least one bowling center command.

Exemplary Computing Device

Figure 3:
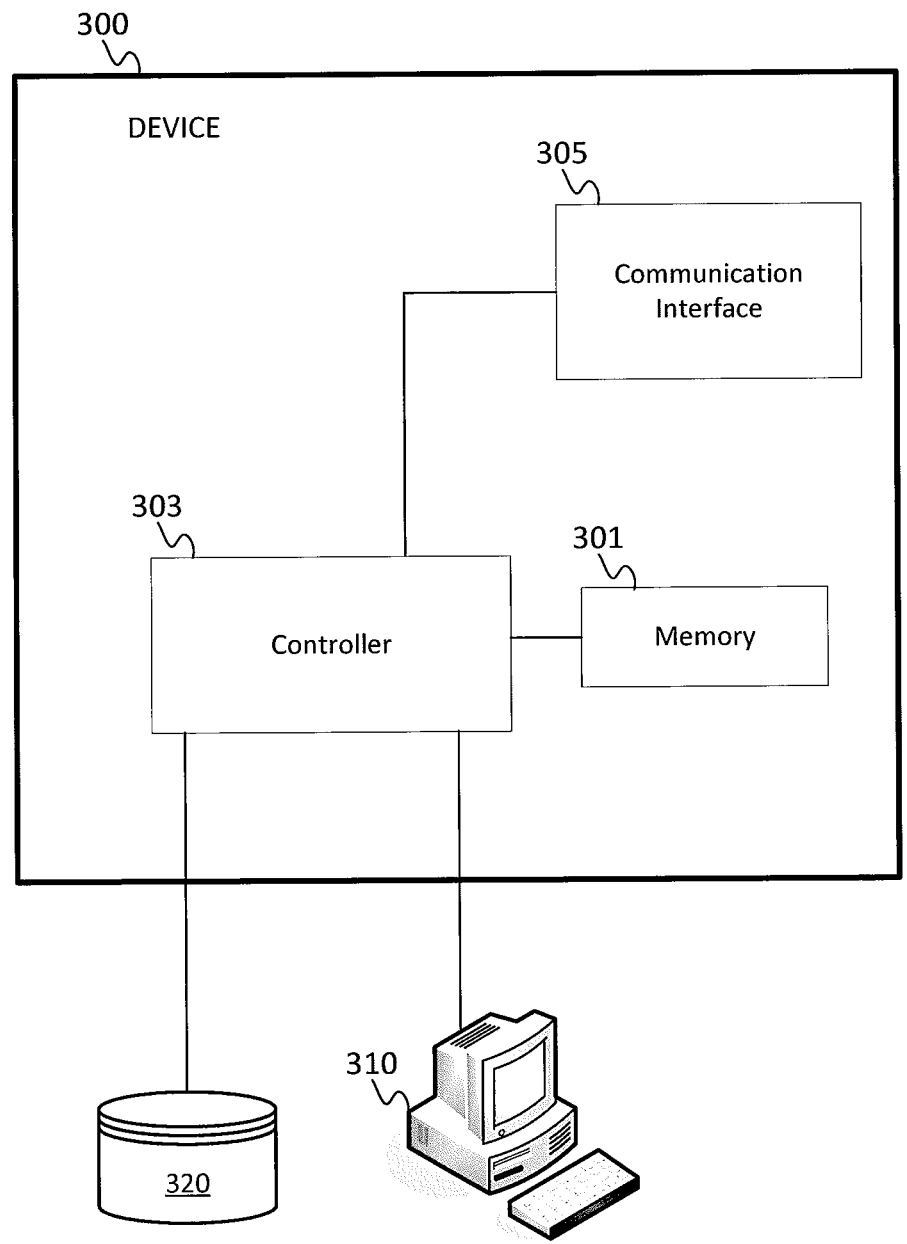
FIG. 3 illustrates a more detailed view of an example computing device of the distributed scoring system of FIG. 2.

FIG. 3 illustrates a more detailed view of a computing device 300 of the distributed scoring system of FIG. 2. The computing device 300 of FIG. 3 corresponds to one or more of the curtain wall computing devices 211*a*-*b*, overhead computing devices 205*a*-*d*, and bowler area computing devices 209*a*-*c*. The computing device 300 includes a controller 303, a memory 301, and a communication interface 305. Additional, fewer, or alternative components may be provided. The computing device 300 may be in communication with a database 320 and or a workstation 310.

The controller 303 is configured to execute at least one bowling center process associated with bowling center peripherals. The bowling center process may be triggered by a bowling event, which may be detected at the same or a different bowling center peripheral. One example bowling event is a ball entering the pin deck, which may or may not involve the ball hitting pins. The detection of the remaining pins is a bowling center function that triggers one or more processes. One example bowling center process triggered by the ball entering the pin deck is the pinsetter process.

The communication interface 305 is configured to connect the computing device 300 and any bowling center peripherals associated with the computing device 300 to the scoring network, which may be the Ethernet network 221. The controller 303 accesses the process map, which defines communication between the computing device 300 and other computing devices. The communication may be in response to the bowling event. The process map is a roadmap to the scoring network. The process map associates process types and process numbers to addresses on the scoring network. Alternatively or in addition, the process map associates computing device types and computing device numbers to addresses on the scoring network.

The bowling center processes may be software elements that control or receive data from the bowling center peripherals. The bowling center processes collaborate to control the logical operation of the distributed scoring system. The bowling center processes are classified by type. Example types include a scoring service process, a display process, a monitor control process, a serial communication process, a pinsetter process, a keypad process, a bumper process, a scoring process, and a device control process.

The scoring service process interfaces the distributed scoring system to a related system in the bowling center. The related system may be a point of sale system, a management system, or a reservation system.

The display system process displays data on a display. The display system process may be executed by the overhead computing device 205 to display data on the overhead monitor 203. The display system process may be executed on the bowler area computing device 209 to display data on the touchscreen 207. The display system process may define what data is displayed and the formatting. The data may include score sheets, menus, messages, advertisement, roster lists or other data.

The monitor control process controls a monitor such as the overhead monitor 203. The monitor control process provides commands such as power control (e.g., on/off), channel selection. The commands may be specific to the type of monitor. Therefore, the monitor control process executed by overhead computing device 205*a* may be different that the monitor control process executed by overhead computing device 205*b*.

The serial communication process manages a serial channel of a computing device. Any of the computing devices may be configured to communicate via a serial channel. Examples includes the serial cables 223 that provide communication line between the pinsetters 201 and the curtain wall computing device 211, between the keypads 207 and the bowler area computing device 209, and between bumpers 16 and the bowler area computing device 209 or the bumper computing device.

The pinsetter process provides a logical interface to pinsetter 201. The keypad process provides the logical key presses from keypad 208. The pinsetter process and the keypad process interact with the serial communication process. The pinsetter process and the keypad process may be purely logical and input and output data to the Ethernet 223. Therefore, the pinsetter process and the keypad process may run on any of the computing devices. In one example, the pinsetter process and the keypad process, respectively, run on the same computing device that executed the associated serial communication process.

The bumper process provides an interface for bumpers 16, which typical operate in pairs, one for each of the gutters on the bowling lane. The bumper process may also be a logical process and can be executed by any of the computing devices.

The scoring process computes scores and manages a bowling session. The scoring process receives data indicative of pins knocked down from the pinsetter process. The scoring process includes calculations of the bowling score. The scoring process may be executed by the bowler area computing device 209 or any of the computing devices. The scoring process may include other manipulations of the score sheet such as the number of players, averages, names, and handicaps.

The device control process manages the computing device itself. The device control process provides functions such as start, stop, restart, standby, or other functions to the computing device.

Each of the bowling center processes may be triggered by another bowling center process or by a bowling event. A bowling event is an event that is detected by a peripheral. The detection may be by a sensor or an input from the user. Example bowling events include a ball being thrown, an object passing the foul line, a key pad entry, a touchscreen entry, a reset button, a help button, or any user input.

The bowling event of the ball being thrown, or passing the pin deck, may trigger multiple bowling center processes in series or parallel. The bowling center process triggered by the ball being thrown may include pinsetter processes such as picking up the remaining pins, clearing the pin deck, replacing the remaining pins, or clearing the remaining pins, as appropriate. The bowling center process triggered by the ball being thrown may include camera processes to detect the remaining pins, which may trigger display processes to show which pins remain, and scoring processes to update the score sheet with the pinfall.

The bowling event of a foul at the foul line may trigger the scoring process to score zero even when pins are knocked down. The foul may be detected by optically, for example, by an optical emitter and receiver. The optical emitter may transmit a beam across the bowling line. Interruption of the beam, for example by the foot of a bowler, results in the foul.

The bowling of the key pad entry or touchscreen entry may trigger the keypad process and display processes to configure or adjust the bowling lineup and other options. The reset button may trigger the pinsetter process to reset the pins. The help button may trigger front desk processes.

The computing devices generate scoring system packages using the process map. A scoring system package is a data construct that provides for communication between bowling center processes. A scoring center package includes a network address for the computing device that generated the scoring system package, which may be referred to as a source computing device and a network address for the computing device that the scoring system package is addressed to, which may be referred to as a destination computing device. In addition, the scoring system package includes package items. A package item includes a type value and includes at least one of a bowling center command and data.

The scoring system package may be in a structured format such as a markup language such as Extensible Markup Language (XML). An example scoring system package is:

```
<System Name>
    <PKGPackage>
        <PKGSource>
            <ProcessName>Display</Process>
            <ProcessNumber>12</ProcessNumber>
            <IPAddress>localhost</IPAddress>
            <Port>7212</Port>
        </PKGSource>
        <PKGDestination>
            <ProcessName>Keypad</Process>
            <ProcessNumber>12</ProcessNumber>
            <IPAddress>localhost</IPAddress>
            <Port>7212</Port>
        </PKGDestination>
        <PKGPackageItems xsi:type="PKGProcessPing">
            <IsRequest>true</IsRequest>
            <ProcessName />
            <ProcessNumber>0</ProcessNumber>
            <Version />
            <DateBuild />
        </PKGPackageItems>
    </PKGPackage>
</System Name>
```

In the example above, the type of the source process is a display process and the number of the source process is 12. The type of the destination process is a keypad process and the number of the destination process is 12. In one example, this corresponds to the bowler area computing device associated with lane 12. The source process and destination process may be associated with the same lane but could be different lanes. Another item of the scoring package is a ping request. The ping request requests configuration information (e.g., version, build date). The address and port in the scoring package is accessed from the process map.

The workstation 310 is a computer that may be connected and disconnected to any of the computing devices 300 or the scoring network to install or configure the distributed scoring system. The workstation 310 may be configured to edit the process map.

The memory 301 may store computer executable instructions for generating and executing bowling center processes. The controller 303 may execute computer executable instructions stored in the memory 301. The computer executable instructions may be included in computer code. The computer code may be written in any computer language, such as C, C++, C#, Java, Pascal, Visual Basic, Perl, Hypertext Markup Language (HTML), JavaScript, assembly language, extensible markup language (XML) and any combination thereof.

The computer code may be stored in one or more tangible media or one or more non-transitory computer readable media for execution by the controller 301. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 303 may include a general processor, digital signal processor, application specific integrated circuit, field programmable gate array, analog circuit, digital circuit, server processor, combinations thereof, or other now known or later developed processor. The controller 303 may be a single device or combinations of devices, such as associated with a network or distributed processing. Any of various processing strategies may be used, such as multi-processing, multi-tasking, parallel processing, remote processing, centralized processing or the like. The controller 303 may be responsive to or operable to execute instructions stored as part of software, hardware, integrated circuits, firmware, microcode or the like.

The communication interface 305 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. As used herein, the phrases "in communication" and "coupled" are defined to mean directly connected to or indirectly connected through one or more intermediate components. Such intermediate components may include both hardware and software based components.

The memory 301 may be any known type of volatile memory or a non-volatile memory. The memory 301 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 301 may include an optical, magnetic (hard drive) or any other form of data storage device.

Exemplary Operational Processes

Figure 4:
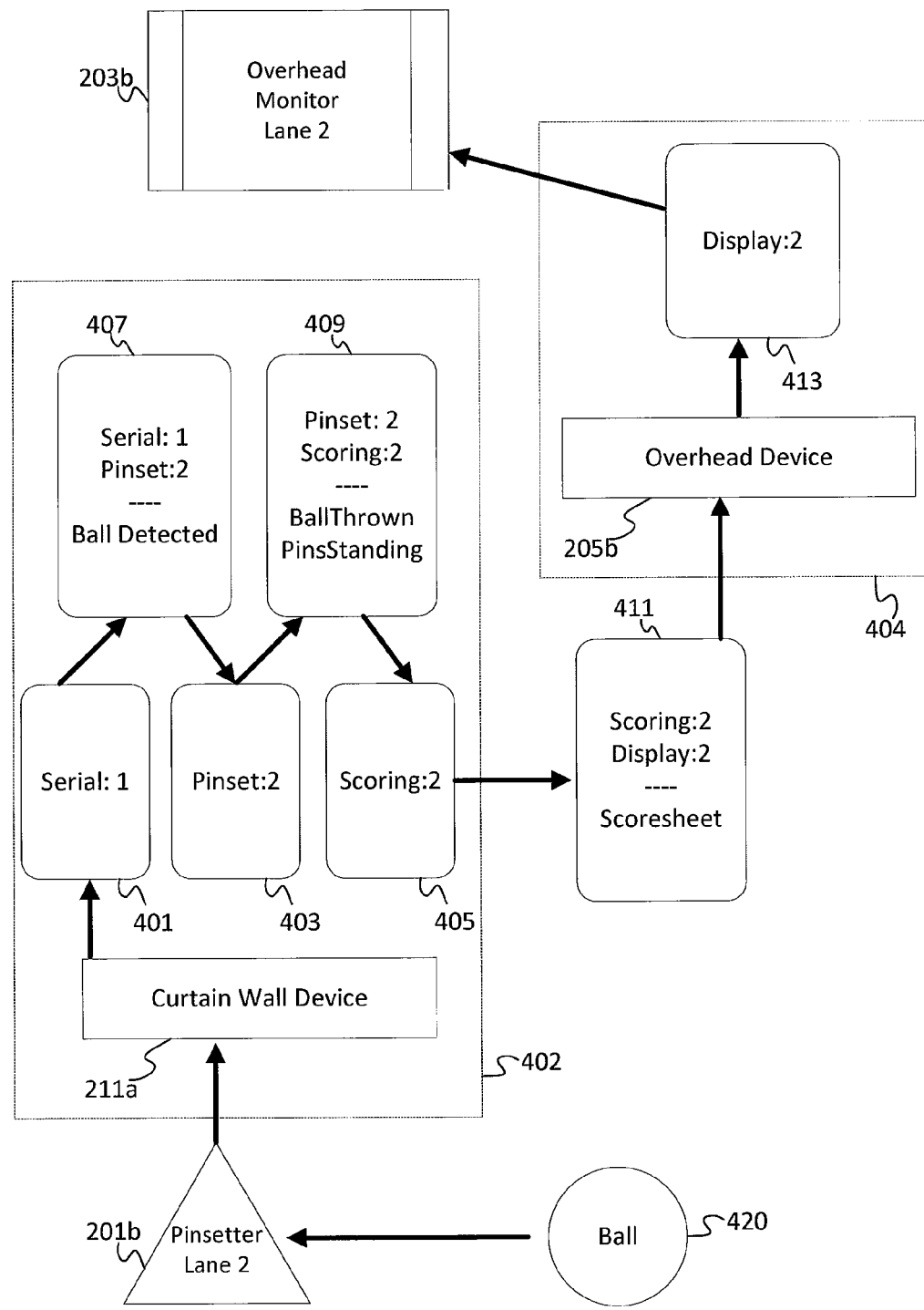
FIG. 4 illustrates a block diagram of an example operational flow of the distributed scoring system of FIG. 2.

FIG. 4 illustrates a block diagram of an operational flow of the distributed scoring system of FIG. 2. The example shown in FIG. 4 relates the bowling event of a ball 420 being thrown. However, any of the bowling events discussed above or any other bowling events involve similar operational flows and one or more resulting bowling center processes.

The ball 420 is the bowling event that is detected either by camera 230, an optical sensor at the bowling pins, or a mechanical sensor behind the bowling pins. The detection of the ball 420 is the bowling center function at the pinsetter peripheral 201b, which is the pinsetter associated with lane 2. The curtain wall computing device 211a for lane 2 receives data indicative of the bowling center function and executes the corresponding bowling center processes.

In the example shown in FIG. 4, three processes are associated with the bowling center function: a serial communication process 401, a pinsetter process 403, and a scoring process 405. As shown by box 402, in this example, the three processes are executed at the curtain wall computing device 211a.

The serial communication process 401, which is assigned a number of 1 because lanes one and two share the serial communication process 401. The serial communication process 401 processes the serial information from the pinsetter 201b and forms the serial information into a first scoring package 407. The first scoring package 407 includes data indicative that a ball was detected. The data may be in a data format specific to the type of pinsetter.

The pinsetter process 403 receives the first scoring package 407. The pinsetter process reformats the data specific to the pinsetter into a second scoring package 409 including package items such as ball speed, ball number (first, second, or third ball of the frame), and pins standing.

The second scoring package 409 is sent to the scoring process 405. The scoring process 405 calculates the resultant score for the current bowling based on the package items in the second scoring package 409. The scoring process 405 generates a third scoring package 411 including score sheet package items.

The third scoring package 411 is sent to the display process, which is assigned number 2. The communication between the curtain wall computing device 211a and the overhead computing device 205b is facilitated by the process map. The communication is, at least indirectly, responsive to the bowling center event of the ball hitting the pins and the bowling center function of the pinsetter peripheral detection the pinfall.

The display process converts the score sheet package items into visual items for display on the overhead monitor 203b, which is assigned to number 2. The visual items may include score sheets, videos in celebration of good scores, or instructional videos or images for the subsequent ball based on the remaining pins. As shown by box 404, the display process 413 may be executed by the overhead computing device 205b assigned to number 2. Because of the distributed nature of the scoring system any of the processes may be executed by any of the computing devices.

Figure 5:
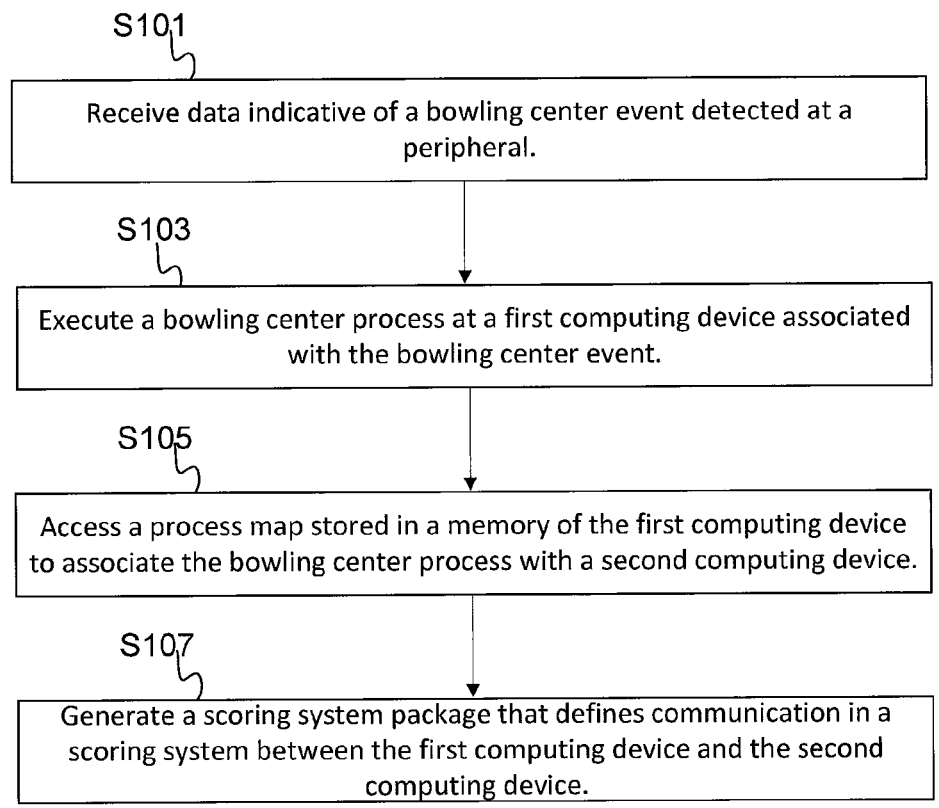
FIG. 5 illustrates a flowchart for an example method of operating the distributed scoring system of FIG. 2.

FIG. 5 illustrates a flowchart for an example method of operating the distributed scoring system of FIG. 2. A peripheral detects a bowling center event. The bowling center event may be a bowling ball that has reached the end of a bowling lane. The bowling ball may be detected by a mechanical sensor or an optical sensor. Other bowling center events involve user inputs. The user inputs can be a foul, data entry onto the touchscreen 207 or keypad 208, a help request, a reset button, or another user input. At S101, a distributed computing device receives data indicative of a bowling center event detected at a peripheral. The data indicative of a bowling center may be a high/low signal or formatted data.

At S103, the distributed computing device executes a bowling center process. The bowling center process may be a scoring service process, a display process, a monitor control process, a serial communication process, a pinsetter process, a keypad process, a bumper process, a scoring process, or a device control process. The distributed computing device may be associated with the particular bowling center event. For example, the distributed computing device may host the peripheral that detected the bowling center event. Each of the distributed computing devices may be physically located closer to peripherals associated with or hosted by the respective distributed computing device.

At S104, the distributed computing device accesses a process map configured to associate the bowling center process with a second distributed computing device and to define communication between the distributed computing device and a second distributed computing device. The communication defined by the process map is responsive to the bowling event or a previous bowling center process, which ultimately was responsive to a bowling center event. The process map describes relationships between the peripherals, devices, and processes within the distributed scoring system. For example, the process map associates an internet protocol address or Ethernet address to an identity of each distributed computing device.

The identity of each distributed computing device may be a unique alphanumeric value that uniquely identifies the distributed computing device with respect to all other devices on the distributed scoring system. The identity of each distributed computing device may include a type value and a lane value. The type value may indicate the location of the distributed computing device (e.g., curtain wall, overhead, bowler area). The lane value indicates which lane is associated with the distributed computing device. Lanes may be grouped individually, in pairs, or in groups of four. The memory storing the process map may be stored locally in each distributed computing device or in a central location such as database 320. The central location may be any one of the computing or hosted in a database or externally at a location on the Internet.

The distributed computed device may also generate a scoring system package that defines the bowling center process as between the network address of the distributed computing device and a network address of the second distributed computing device. The second distributed computing device executes a second bowling center process at the second computing device in response to receipt of the scoring system package.

In one alternative, the example embodiments above are combined with the embodiments described in U.S. patent application Ser. No. 13/413,035 titled Mobile Scoring System Control, filed Mar. 6, 2012, by Brandon J. Meigs and Gary A. Brouwers, which is hereby incorporated by reference.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A distributed bowling center system comprising:
a plurality of bowling center peripherals, including a first peripheral and a second peripheral, wherein each of the plurality of peripherals are configured to perform at least one bowler center function;
a first computing device located physically closer to the first peripheral than to the second peripheral and configured to execute at least one process related to the at least one bowler center function; and
a second computing device located physically closer to the second peripheral than to the first peripheral and configured to execute at least one process related to the at least one bowler center function, wherein the second computing device is in communication with the first computing device via a network,
wherein the first computing device is configured to access a process map defining communication between the first computing device and the second computing device and the communication is responsive to the at least one bowler center function.

2. The distributed bowling center system of claim 1, wherein at least one process on the first computing device function can communicate with the second computing device without knowledge of the second computing device's location on the network.

3. The distributed bowling center system of claim 1, wherein the first peripheral is a pinsetter and the second computing device is an overhead computing device.

4. The distributed bowling center system of claim 1, wherein the first computing device is configured to generate a scoring system package that defines a bowling center process involving the first computing device and the second computing device.

5. The distributed bowling center system of claim 4, wherein the process map is configured to resolve an identification value of the bowling center process to a network address of the second computing device, wherein the network address of the second computing device is internal to the network.

6. The distributed bowling center system of claim 1, wherein the process map is configured to identify each of the plurality of peripherals according to a peripheral type and a lane value.

7. The distributed bowling center system of claim 4, wherein the peripheral type is a pinsetter, a monitor, a bumper, a keypad, or a touchscreen.

8. The distributed bowling center system of claim 1, wherein the process map is configured to identify the first computing device and the second computing device according to a location type and a lane value.

9. The distributed bowling center system of claim 6, wherein the location type is an overhead location, a bowlers location, a curtain wall location, a back office location, a desk location, or a test location.

10. The distributed bowling center system of claim 1, wherein the process map is configured to identify a bowling center process according to a process type and a lane value.

11. A distributed computing device for a bowling center comprising:
a controller configured to execute a bowling center process associated with a bowling center peripheral and a bowling event;
a communication interface configured to connect the computing device and the bowling center peripheral to a network; and
a memory configured to store a process map defining communication between the distributed computing device and a second distributed computing device by providing a network location of the second computing device to the bowling center process, wherein the communication is responsive to the bowling event.

12. The distributed computing device of claim 11, wherein the controller is configured to generate a scoring system package that defines the bowling center process as between the distributed computing device and the second distributed computing device.

13. The distributed computing device of claim 11, wherein the process map is configured to resolve an identification value the bowling center process to a network address of the second distributed computing device.

14. The distributed computing device of claim 11, wherein the process map is configured to identify the bowling center peripheral according to a peripheral type and a lane value.

15. The distributed computing device of claim 14, wherein the peripheral type is a pinsetter, a monitor, a bumper, a keypad, or a touchscreen.

16. The distributed computing device of claim 11, wherein the process map is configured to identify the distributed computing device according to a location type and a lane value.

17. The distributed computing device of claim 14, wherein the location type is an overhead location, a bowlers location, a curtain wall location, a back office location, a desk location, or a test location.

18. The distributed computing device of claim 11, wherein the process map is configured to identify the bowling center process according to a process type and a lane value, wherein the process type is a scoring process, a display process, a pinsetter process, a keypad process, or a bumper process.

19. A method for distributed computing in a bowling center comprising:
receiving data indicative of a bowling center event detected at a peripheral;
executing a bowling center process at a first distributed computing device associated with the bowling center event;
accessing a process map configured to associate the bowling center process with a second distributed computing device and to define communication between the first distributed computing device and a second distributed computing device,
wherein the communication is responsive to the bowling event.

20. The method of claim 19, further comprising:
generating a scoring system package that defines the bowling center process as between the network address of the first distributed computing device and a network address of the second distributed computing device.

21. The method of claim 20, further comprising:
executing a second bowling center process at the second computing device in response to receipt of the scoring system package.

22. The method of claim 19, wherein the process map is configured to identify at least one peripheral according to a peripheral type and a lane value, and the peripheral type is a pinsetter, a monitor, a bumper, a keypad, or a touchscreen.

23. The method of claim 19, wherein the process map is configured to identify the computing device according to a location type and a lane value, and the location type is an overhead location, a bowlers location, a curtain wall location, a back office location, a desk location, or a test location.

\* \* \* \* \*